United States Patent [19]

Wilson

[11] 3,915,939

[45] Oct. 28, 1975

[54] HIGH TEMPERATURE FILM FORMING POLYAMIDE POLYMERS

[75] Inventor: John Charles Wilson, Rochester, N.Y.

[73] Assignee: Eastman Kodak Company, Rochester, N.Y.

[22] Filed: Jan. 27, 1975

[21] Appl. No.: 544,170

Related U.S. Application Data

[62] Division of Ser. No. 444,611, Feb. 21, 1974.

[52] U.S. Cl............ 260/78 R; 96/87 R; 260/47 CZ
[51] Int. Cl.².................G08G 69/44; G03C 1/78; G08G 73/16
[58] Field of Search............ 96/87 R, 48 HD, 114.1; 260/78 R

[56] References Cited
UNITED STATES PATENTS

| | | | |
|---|---|---|---|
| 3,725,070 | 4/1973 | Hamb et al. | 96/87 R |
| 3,803,090 | 4/1974 | Wilson | 96/87 R |
| 3,859,364 | 1/1975 | Wilson | 96/87 R |
| 3,873,320 | 3/1975 | Wilson | 96/87 R |

*Primary Examiner*—Roland E. Martin, Jr.
*Assistant Examiner*—J. P. Brammer
*Attorney, Agent, or Firm*—A. H. Rosenstein

[57] ABSTRACT

High temperature-resistant polyamides are derived from alkyl substituted aminophenylindanamines and dicarboxylic acids or their derivatives. Films formed from the polyamides are useful in photographic elements, particularly as supports in photographic elements.

18 Claims, No Drawings

HIGH TEMPERATURE FILM FORMING POLYAMIDE POLYMERS

This is a division of application Ser. No. 444,611, filed Feb. 21, 1974.

This invention relates to novel film-forming polyamides. In one aspect this invention relates to film-forming polyamides derived from 1,1,3-trialkyl-3-(p-aminophenyl)-5-indanamine and dicarboxylic acid and dicarboxylic acid derivatives. In another aspect this invention relates to photographic elements containing the polyamides, preferably as a film support.

There is a continuing demand for low cost film-forming materials with improved physical properties which can be used as supports for photographic elements. Many of the currently available film-forming compositions that exhibit good physical characteristics are commercially unattractive owing to the cost of the component ingredients or the difficulty of the manufacturing conditions.

U.S. Pat. No. 3,725,070, issued Apr. 3, 1973, relates to high temperature-resistant polymers of 1,1'-spirobi[indan]diols or diamines which may be used in photographic applications and U.S. Pat. No. 3,634,089, issued Jan. 11, 1972 relates to polymers of 1,1,3-trimethyl-5-carboxy-3-(p-carboxyphenyl)indan esters having high glass transition temperatures which are useful in photographic elements.

Means for the preparation of 1,1,3-trimethyl-3-(p-aminophenyl)-5-indanamine are described in Petropoulous, John C. and Fisher, James J., J. Am. Chem. Soc., Volume 80, 1938–41 (1958) and U.S. Pat. No. 2,855,420, issued Oct. 7, 1958 to Petropoulous.

Polyamides derived from conventional diamines and a commercially available material referred to as phenylindandicarboxylic acid are described in U.S. Pat. No. 3,376,270, issued Apr. 2, 1968 to Ridgeway.

It is an object of this invention to provide novel polymeric amides having high glass transition temperatures suitable for high temperature applications which are economically prepared.

It is another object of this invention to provide films which are resistant to high temperatures and which can be solvent-cast.

It is a further object of this invention to provide photographic film supports comprising the novel polyamides of this invention.

These and other objects of this invention are obtained from film-forming polyamides derived from alkyl substituted aminophenylindanamines and dicarboxylic acid or acid derivatives.

The present invention comprises a film-forming polyamide comprising amine repeating units (A) and dicarboxylic acid repeating units (B) having the formulas:

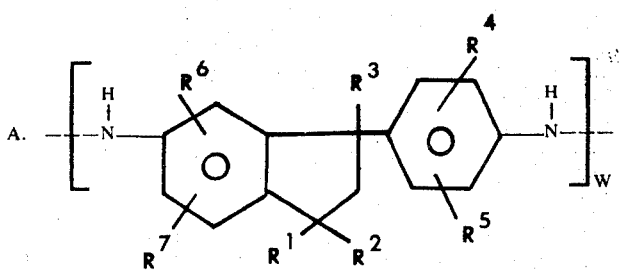

and

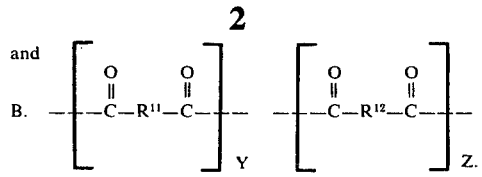

wherein:

$R^1$ and $R^3$ are independently selected from the group consisting of hydrogen and alkyl, preferably containing from 1 to 6 carbon atoms such as methyl, ethyl, propyl, butyl, pentyl and hexyl and isomers thereof. In a preferred embodiment $R^1$ and $R^3$ are methyl;

$R^2$ is alkyl of from 1 to 6 carbon atoms such as those described above for $R^1$ and $R^3$. In a preferred embodiment $R^2$ is methyl;

$R^4$, $R^5$, $R^6$ and $R^7$ are independently selected and can be hydrogen atoms, aryl radicals such as phenyl, naphthyl, anthryl, phenanthryl and the like, including substituted aryl radicals, halogen atoms, nitro radicals, tertiary amino radicals, cyano radicals, alkoxy radicals and the like, wherein the substituents on the substituted aryls are limited to the above radicals. In a preferred embodiment $R^4$, $R^5$, $R^6$ and $R^7$ are hydrogen.

$R^{10}$, $R^{11}$ and $R^{12}$ are independently selected from the group consisting of aliphatic, cycloaliphatic and aromatic moieties. More specifically, $R^{10}$, $R^{11}$, and $R^{12}$ can be radicals selected from the group consisting of alkylene radicals of from 2 to 10 carbon atoms, such as ethylene, tetramethylene, pentamethylene, octamethylene, nonamethylene and the like; arylene radicals, such as o-, m-, or p-phenylene, naphthylene or anthrylene, unsubstituted or substituted with radicals such as halogen, nitro, cyano, alkyl of 1 to 6 carbon atoms or alkoxy of 1 to 6 carbon atoms; arylenebisalkylene radicals wherein the alkylene portion has 1 to 6 carbon atoms, such as phenylenedimethylene, phenylenediethylene, naphthylene, dimethylene, naphthylenediethylene and the like; cycloalkylene radicals, such as cyclopentylene, cyclohexylene, norbornylene; alkylenebisarylene radicals where the alkylene portion contains 1 to 12 carbon atoms, such as ethylene, trimethylene, hexamethylene, decamethylene, dodecamethylene, and the arylene portion is as defined above; alkylidenebisarylene radicals where the alkylidene portion contains 1 to 12 carbon atoms, such as ethylidene, allylidene, hexylidene and the like, and the arylene portion is defined above; and arylenealkylene radicals where the arylene and alkylene portions are as defined above.

The radicals $R^{10}$, $R^{11}$ and $R^{12}$ can also be units having the formula:

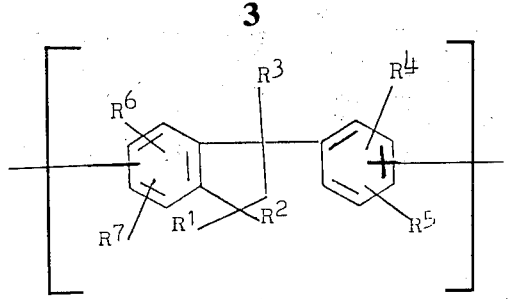

or $R^{10}$, $R^{11}$ and $R^{12}$ can be represented by the formula:

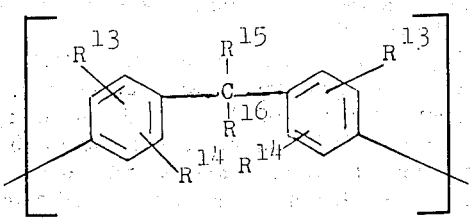

wherein each $R^{13}$ and $R^{14}$, which can be the same or different, are selected from the group consisting of hydrogen atoms, aryl radicals, such as phenyl, including substituted phenyl, halogen atoms, nitro radicals, tertiary amino radicals, cyano radicals, alkoxy radicals and the like, and wherein the substitutents on the phenyl radical can be a halogen atom, nitro radical, tert-amino radical, cyano radical, or alkoxy radical. $R^{15}$ and $R^{16}$ represent aliphatic monocyclic or bicyclic radicals or can each be hydrogen atoms, alkyl radicals or from 1 to 6 carbon atoms, including substituted alkyl radicals, such as fluoromethyl, difluoromethyl, trifluoromethyl, dichlorofluoromethyl, 2-[2,3,4,5-tetrahydro-2,2-dimethyl-4-oxofur-3-yl]ethyl and the like; cycloalkyl radicals of from 4 to 6 carbon atoms, such as cyclohexyl; and aromatic radicals having from 6 to 20 carbon atoms, such as phenyl, 3,4-dichlorophenyl, 2,4-dichlorophenyl. $R^{15}$ and $R^{16}$ taken together with the carbon atom to which they are attached can represent a monocyclic, polycyclic, or heterocyclic moiety having from 4 to 15 atoms in the ring system. In a preferred embodiment $R^{11}$ is arylene and $R^{10}$ is alkylene.

$R^8$ and $R^9$ are independently selected from the group consisting of hydrogen, alkyl, preferably containing from 1 to 6 carbon atoms, such as methyl, ethyl, isopropyl, butyl and hexyl including substituted alkyl, such as 2-chloroethyl, 2-methoxyethyl, 3-bromopropyl and the like; and aryl such as phenyl, including substituted phenyl such as methoxyphenyl, bromophenyl, nitrophenyl and the like.

The polymer comprises at least two repeating units A and B. Repeating units A are derived from diamines and repeating units B are derived from dicarboxylic acids or their derivatives. In repeating units A, W is from 1 to 100 mole percent and X is 100-W mole percent and in repeating units B Y is from 1–100 mole percent and Z is 100-Y mole percent.

The polyamides, generally, may have a broad range of viscosities. In a preferred embodiment, the polyam-ides have inherent viscosities ranging from 0.35 to 1.5 as determined in a 1:1 weight ratio of phenol and chlorobenzene solution at a concentration of 0.25 gram of polymer in 100 ml of solution at 25°C.

The polyamides have relatively high glass transition temperatures of at least 150°C as determined with DuPont 900 and 990 differential scanning calorimeters at a heating rate of 10°C per minute in nitrogen.

"Film-forming" as used herein refers to a material which provides a self-supporting film of the material when cast or extruded, for example, when cast in sheets of from 1–7 mils thickness.

The film-forming polyamides of this invention are prepared by merely mixing an alkyl substituted aminophenylindanamine in a solvent such as tetrahydrofuran, dioxane, or the like with a solution of a dicarboxylic acid halide in a solvent such as tetrahydrofuran, dioxane, or the like. Acid acceptors such as $Na_2CO_3$, $K_2CO_3$, NaOH, and the like are also employed. The general method of preparing polyamides such as disclosed in U.S. Pat. No. 3,006,899 issued Oct. 31, 1961 may be used to prepare the polyamides herein.

The alkyl substituted aminophenylindanamines are prepared as described in U.S. Pat. No. 2,855,420. The preparation of the preferred 1,1,3-trimethyl-3-(p-aminophenyl)-5-indanamine is described at column 4, line 60 to column 5, line 5 of U.S. Pat. No. 2,855,420.

Dicarboxylic acids which can be employed in preparing the polyamides include succinic acid, glutaric acid, 2-methyladipic acid, diglycolic acid, thiodiglycolic acid, fumaric acid, cyclohexane-1,3-dicarboxylic acid, cyclohexane-1,4-dicarboxylic acid, cyclopentane-1,3-dicarboxylic acid, 2,5-norbornanedicarboxylic acid, (the four immediately preceding acids being useful either as the cis or trans form), phthalic acid, isophthalic acid, terephthalic acid, t-butylisophthalic acid, phenylenediacetic acid, phenylenedipropionic acid, 2,6-naphthelenedicarboxylic acid, 1,4-naphthelenedicarboxylic acid, 1,5-naphthalenedicarboxylic acid, 1,7-naphthalenedicarboxylic acid, 4,4'-diphenic acid, 4,4'-sulfonyldibenzoic acid, 4,4'-oxydibenzoic acid, binaphthyldicarboxylic acid, 4,4'-stilbenedicarboxylic acid, and 9,10-triptycenedicarboxylic acid.

Although the dicarboxylic acids useful in the practice of this invention are employed to advantage in the acid halide form, e.g., the chloride or bromide, the lower monohydric alcohol or phenyl esters of these acids may also be used. Further, the free dicarboxylic acids are also useful.

The film-forming polyamides of this invention can be formed by mixing one or more dicarboxylic acid derivatives with the aminophenylindanamine or with the aminophenylindanamine in combination with another diamine having the formula:

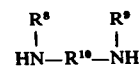

wherein:

$R^8$, $R^9$ and $R^{10}$ are as described above. Examples of these diamines are ethylenediamine, 1,2-propanediamine, 1,3-propanediamine, 1,4-butanediamine, 1,6-hexanediamine, 1,4-cyclohexylenediamine, 1,4-cyclohexylbis(methylamine), 1,8-menthanediamine, N,N'-dimethyl-1,4- butanediamine, N,N'-diethyl-1,4-hexanediamine, o-, m-, or p-phenylenediamine or tolylenediamine, and the like.

Thus the polyamide may be formed from the aminophenylindanamine and one dicarboxylic acid halide such as in equation 1.

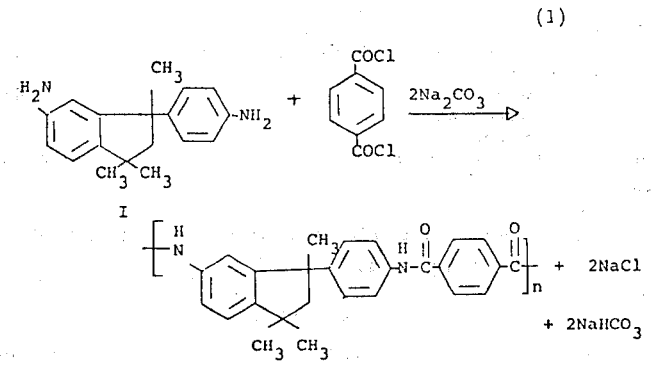

If more than one dicarboxylic acid halide is employed the reaction may be characterized as in equation 2.

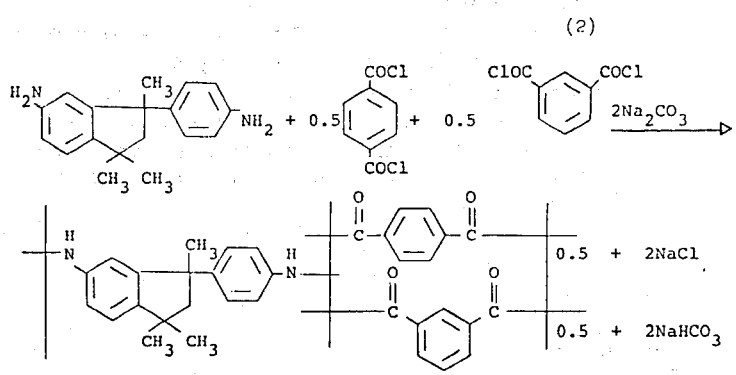

If more than one diamine is employed the reaction may be characterized as in equation 3

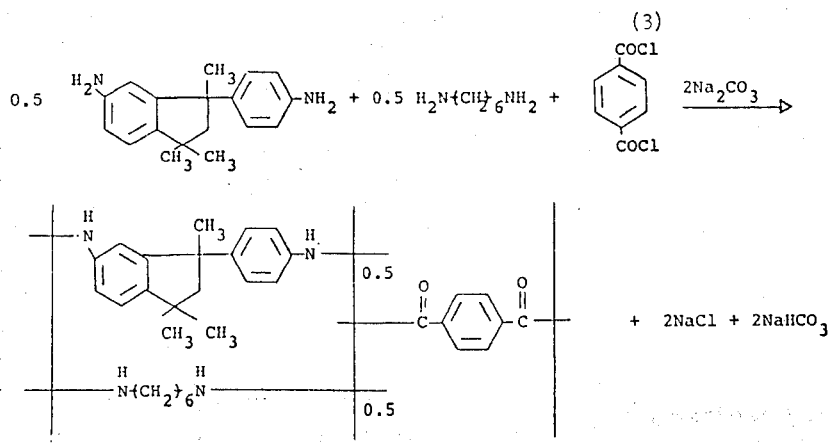

It is understood that the total moles of diamine must equal the total moles of diacid employed. When mixed diamines and/or mixed diacids are used, the diamine:-diamine and diacid:diacid ratios can be varied as desired to effect changes over a wide range in the physical properties of the polymers of this invention, such as, for example, the glass transition temperature, yield strength, break strength, Young's modulus and the like. Polymers with properties in a particular range can be obtained by judicious selection of appropriate diamine and dicarboxylic acid components and suitable mixtures thereof. The proper choice and proportions of the monomeric components can be determined by test procedures well known to those skilled in the art.

The film-forming materials of this invention can be generally extruded or cast into flexible supports and used in various layer arrangements and structural combinations. Generally, the flexible supports prepared from the polymers of this invention are treated by any convenient method to improve the adhesion of superimposed coatings of layers. Useful procedures include subbing with conventional subbing agents for polymer supports, contacting with a chemical agent, electron bombardment, and the like. The film-forming polymers of this invention are used to advantage as flexible supports, overcoats or binders for photographic silver halide and other light-sensitive systems as well as for multi-layer elements used in color photographic diffusion transfer processes.

The following examples are included for a further understanding of this invention.

EXAMPLE 1

A solution of 2.66 g of 1,1,3-trimethyl-3-(p-aminophenyl)-5-indanamine in 56 ml of tetrahydrofuran and a solution of 2.12 g of sodium carbonate in 67 ml of distilled water were poured in a Waring blender, and stirred. To this stirred mixture was added a solution of 2.03 g of terephthaloyl chloride in 17 ml of tetrahydrofuran. This mixture was stirred for 10 minutes and poured into methanol. The polymer was isolated, washed with methanol and dried in vacuum at 80°C for 5 hours. The resulting polyamide had an inherent viscosity of 0.89.

EXAMPLES 2–4

Solutions of 1,1,3-trimethyl-3-(p-aminophenyl)-5-indanamine were reacted as in Example 1 with dicarboxylic acid chlorides having the formula

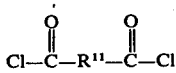

the properties of the resulting polyamides are shown in Table I.

TABLE 1

| Example | R¹¹ | Inherent Viscosity | Glass Transition Temp. (Tg) (°C) |
|---|---|---|---|
| 1 | *p-phenylene* | 0.89 | 352 |
| 2 | *m-phenylene (dimethyl)* | 0.41 | 327 |
| 3 | *indane-phenyl* | 1.01 | 341 |
| 4 | $-(CH_2)_8-$ | 0.37 | 175 |

EXAMPLE 5

A polyamide was prepared by the process of Example 1 with the following reactants and solvents:

| | |
|---|---|
| 1,1,3-trimethyl-3-(p-aminophenyl)-5-indanamine | 2.66 g |
| tetrahydrofuran | 56 ml |
| sodium carbonate | 2.12 g |
| distilled water | 67 ml |
| terephthaloyl chloride | 1.015 g |
| isophthaloyl chloride | 1.015 g |
| tetrahydrofuran | 17 ml |

The inherent viscosity of the resulting polyamide was 0.83 and the glass transition temperature was 345°C.

EXAMPLE 6

A polyamide was prepared using the process of Example 1 with the following reactants and solvents:

| | |
|---|---|
| 1,1,3-trimethyl-3-(p-aminophenyl)-5-indanamine | 1.33 g |
| 1,6-hexanediamine | 0.58 g |
| tetrahydrofuran | 56 ml |
| sodium carbonate | 2.12 g |
| distilled water | 67 ml |
| terephthaloyl chloride | 2.03 g |
| tetrahydrofuran | 17 ml |

The resulting polyamide has an inherent viscosity of 0.82 and a glass transition temperature of 272°C.

EXAMPLE 7

A solution comprising 2 g of the polyamide of Example 1 dissolved in 10 ml of N,N-dimethylformamide was coated onto a chrome plated surface at 20°C at a thickness of 25 mils with a coating knife. The resultant film was then cured for 45 minutes at 20°C and then at 70°C for 1 hour and 15 minutes. The film was then cooled, removed from the coating block and cured in a 100°C air oven between 2 frames for 16 hours. A tough, clear and essentially colorless self-supporting film was formed which had the properties listed in Table 2. The film was also heated on a curved surface and observed with respect to distortion at various temperatures. No distortion was noted in the observed range of 155°C to 300°C.

Table 2

Tensile Properties of Film (2" gauge length, 1" wide, 1" per min.)

| | |
|---|---|
| Average thickness, mils | 4.5 |
| Young's Modulus, psi | $3.6 \times 10^5$ |
| Yield Strength, psi | $1.01 \times 10^4$ |
| Break Strength, psi | $1.13 \times 10^4$ |
| Break Elongation, % | 6.5 |

EXAMPLE 8

A film strip prepared as in Example 7 was treated by the process described on pages 12 and 13 of U.S. patent application Ser. No. 196,725, filed Nov. 8, 1971 and in French Pat. No. 2,022,357. The treated film was then coated with a conventional silver halide emulsion and dried. The emulsion adhered very well to the film base when tested by the cellophane tape test on a razor-scored surface.

The invention has been defined in detail with particular reference to preferred embodiments thereof, but it will be understood that variations and modifications can be effected within the spirit and scope of the invention.

I claim:

1. A film-forming polyamide comprising amine repeating units (A) and dicarboxylic acid repeating units (B) having the formulas

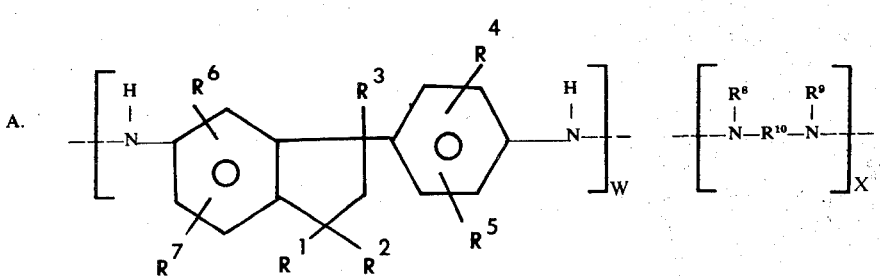

and wherein $R^1$ and $R^3$ are independently selected from the group consisting of hydrogen and alkyl of from 1 to 6 carbon atoms;

$R^2$ is alkyl of from 1 to 6 carbon atoms;

$R^4$, $R^5$, $R^6$ and $R^7$ are independently selected from the group consisting of hydrogen, aryl, halogen, nitro, cyano, tertiary amino or alkoxy; $R^8$ and $R^9$ are independently selected from the group consisting of hydrogen, alkyl and aryl;

$R^{10}$, $R^{11}$ and $R^{12}$ are independently selected from the group consisting of aromatic, cycloaliphatic, and aliphatic groups; and W represents from 1 to 100 mole percent of unit A, X represents 100-W mole percent of unit A, Y represents from 1 to 100 mole percent of unit B and Z represents 100-Y mole percent of unit B.

2. The polyamide of claim 1 wherein $R^1$, $R^2$ and $R^3$ are methyl.

3. The polyamide of claim 1 wherein $R^4$, $R^5$, $R^6$ and $R^7$ are hydrogen.

4. The polyamide of claim 1 wherein $R^{11}$ is arylene.

5. The polyamide of claim 4 wherein $R^{12}$ is arylene.

6. The polyamide of claim 1 wherein $R^{10}$ is alkylene.

7. The polyamide of claim 1 wherein W is 100 mole percent of unit (A).

8. A film-forming polyamide comprising repeating units having the formula:

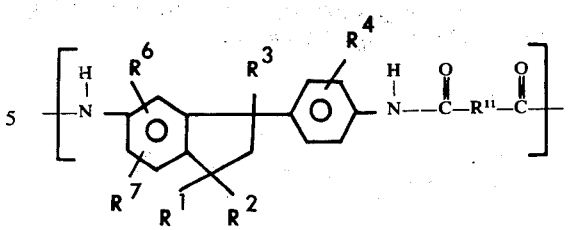

wherein $R^1$ and $R^3$ are independently selected from the group consisting of hydrogen and alkyl of from 1 to 6 carbon atoms;

$R^2$ is alkyl of from 1 to 6 carbon atoms;

$R^4$, $R^5$, $R^6$ and $R^7$ are independently selected from the group consisting of hydrogen, aryl, halogen, nitro, cyano, tertiary amino or alkoxy; and $R^{11}$ is an aromatic, cycloaliphatic or aliphatic group.

9. The film-forming polyamide of claim 8 wherein $R^1$, $R^2$ and $R^3$ are methyl.

10. The film-forming polyamide of claim 8 wherein $R^4$, $R^5$, $R^6$ and $R^7$ are hydrogen.

11. The film-forming polyamide of claim 8 wherein $R^{11}$ is arylene.

12. A film-forming polyamide comprising repeating units having the formula comprising:

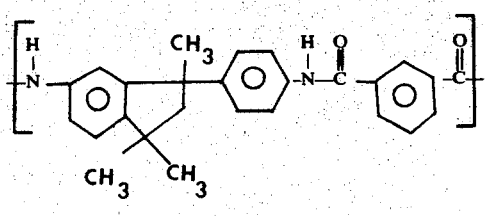

13. A film-forming polyamide comprising repeating units having the formula comprising:

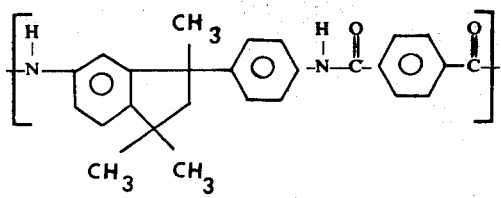

14. A film-forming polyamide comprising repeating units having the formula comprising:

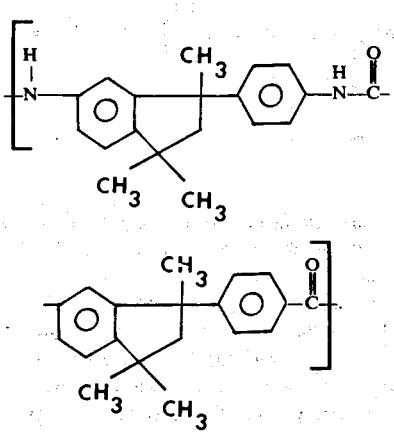

15. A film-forming polyamide comprising repeating units having the formula comprising:

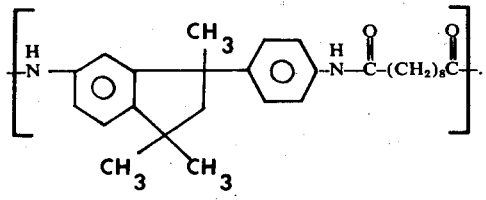

16. A film-forming polyamide comprising repeating units having the formula comprising:

Unit (A)

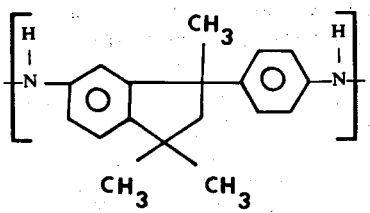

and

Unit (B)

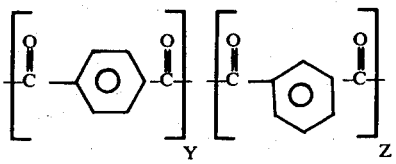

wherein Y is from 1 to 100 mole percent of unit (B) and Z is 100-Y mole percent of unit (B).

17. A film-forming polyamide comprising repeating units having the formulas comprising:

Unit (A)

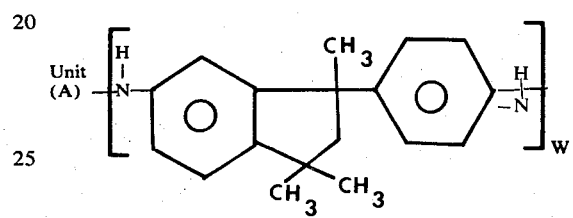

-Continued

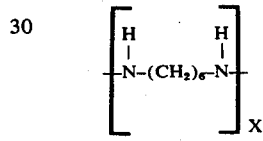

Unit (B)

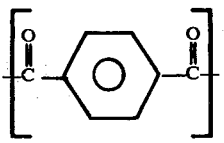

wherein W is from 1 to 100 mole percent of unit A and X is 100-W mole percent of unit A.

18. A film formed from the polyamide of claim 1.

* * * * *